(12) United States Patent
Greenwell

(10) Patent No.: US 6,684,614 B2
(45) Date of Patent: Feb. 3, 2004

(54) MOBILE POWER DRIVEN VEGETATION TRIMMER AND LINE FEED CONTROL

(76) Inventor: Owen Patrick Greenwell, 487 D. E. Brown Rd., Brandenburg, KY (US) 40108

(*) Notice: Subject to any disclaimer, the term of this patent is extended or adjusted under 35 U.S.C. 154(b) by 115 days.

(21) Appl. No.: 09/770,914

(22) Filed: Jan. 26, 2001

(65) Prior Publication Data

US 2002/0100266 A1 Aug. 1, 2002

Related U.S. Application Data

(60) Provisional application No. 60/215,751, filed on Jun. 30, 2000.

(51) Int. Cl.$^7$ ............................................. A01D 69/08
(52) U.S. Cl. ................................. 56/11.7; 56/10.7
(58) Field of Search ................... 56/11.7, 16.7, 56/12.7, 10.7, 15.2, DIG. 3; 30/276; 172/13

(56) References Cited

U.S. PATENT DOCUMENTS

| | | | | |
|---|---|---|---|---|
| 3,087,296 A | * | 4/1963 | Cowles | 56/10.7 |
| 3,274,762 A | | 9/1966 | Jolls | |
| 3,729,910 A | | 5/1973 | Hardee | |
| 4,020,552 A | * | 5/1977 | Mizuno et al. | 30/276 |
| 4,151,646 A | * | 5/1979 | Lane | 30/276 |
| 4,185,381 A | * | 1/1980 | Palmieri et al. | 30/347 |
| 4,206,580 A | * | 6/1980 | Truax et al. | 56/10.4 |
| 4,236,309 A | * | 12/1980 | Cayou | 30/276 |
| 4,419,822 A | * | 12/1983 | Harris | 30/276 |
| 4,509,315 A | * | 4/1985 | Giguere | 56/10.7 |
| 4,518,043 A | * | 5/1985 | Anderson et al. | 172/6 |
| 4,584,771 A | * | 4/1986 | Tillotson | 30/276 |
| 4,802,327 A | | 2/1989 | Roberts | |
| 4,873,818 A | | 10/1989 | Turner | |
| 4,901,508 A | | 2/1990 | Whatley | |
| 4,996,830 A | | 3/1991 | Davison | |
| 5,040,360 A | | 8/1991 | Meehleder | |
| 5,050,372 A | | 9/1991 | Heiskell | |
| 5,303,532 A | * | 4/1994 | Phillips | 56/12.7 |
| 5,341,629 A | * | 8/1994 | Penner | 56/15.2 |
| 5,396,754 A | | 3/1995 | Fraley | |
| 5,704,201 A | | 1/1998 | Van Vleet | |
| 5,806,192 A | * | 9/1998 | Everts et al. | 30/276 |
| 6,279,235 B1 | * | 8/2001 | White, III et al. | 30/276 |

FOREIGN PATENT DOCUMENTS

GB 1267928 3/1972

* cited by examiner

*Primary Examiner*—Árpád Fábián Kovács
(74) *Attorney, Agent, or Firm*—David W. Carrithers; Carrithers Law Office

(57) ABSTRACT

A vegetation trimmer unit having an open generally 'U'-shaped frame with a power driven string line cutter mounted thereon. A linkage mechanism permits the cutter head to move relative to the frame against a spring biasing the cutter head in a direction outwardly away from the frame. The trimmer unit is suspendable from the free outer end of an extendible and retractable vehicle mounted boom. An actuator located on the vehicle is used to dispense sequentially predetermined lengths of line from the string line cutter.

26 Claims, 14 Drawing Sheets

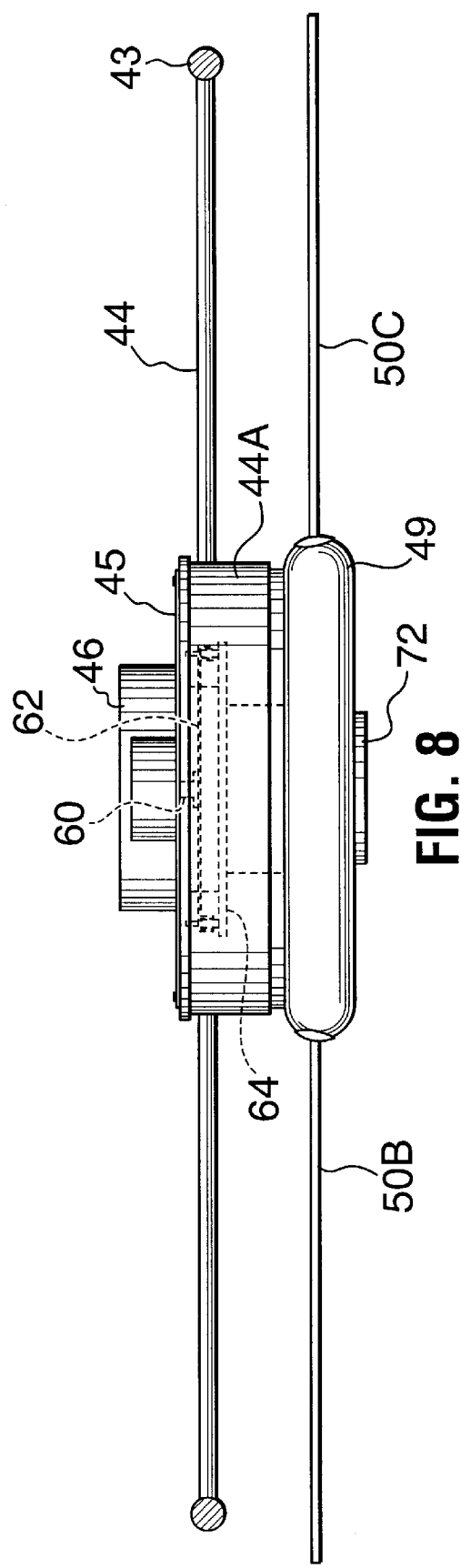

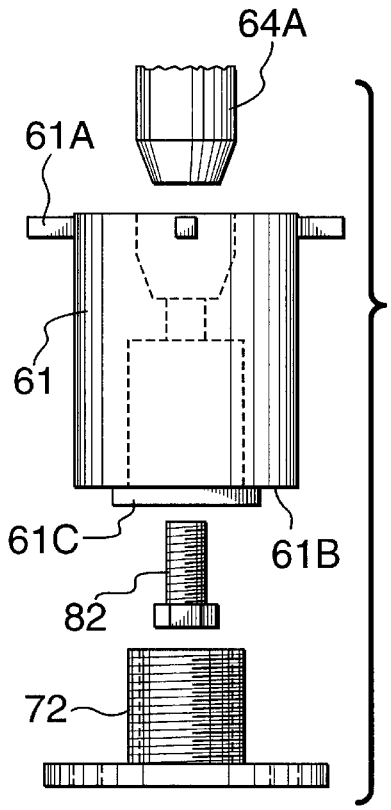
FIG. 11
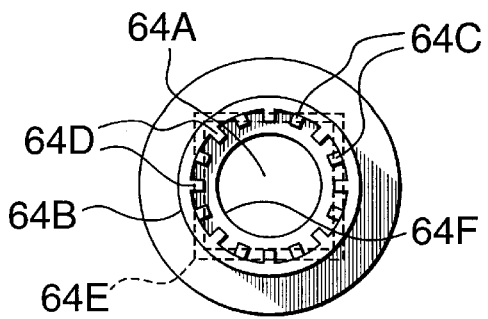
FIG. 12
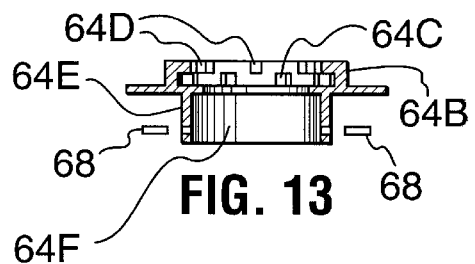
FIG. 13
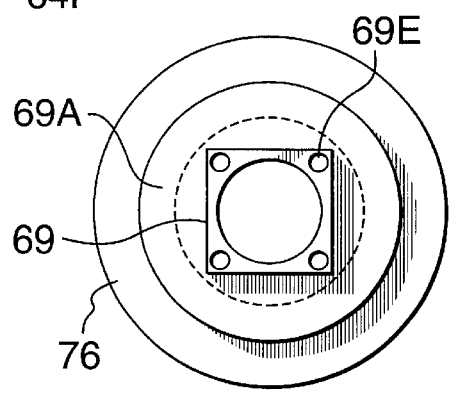
FIG. 14
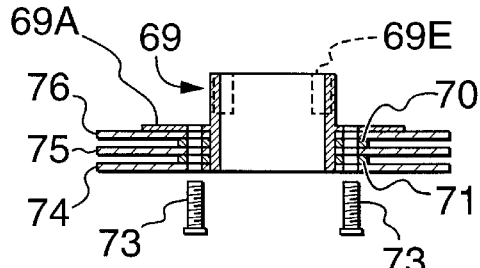
FIG. 15
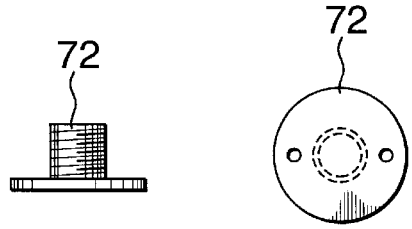
FIG. 16     FIG. 17

MOBILE POWER DRIVEN VEGETATION TRIMMER AND LINE FEED CONTROL

This application claims the benefit of Provisional application Ser. No. 60/215,751, filed Jun. 30, 2000.

BACKGROUND OF THE INVENTION

1. Technical Field

This invention relates generally to vegetation trimmers and more particularly to a power driven remotely controlled trimmer unit mountable on a boom carried by a motorized mobile vehicle for trimming on flat surfaces, on inclined surfaces, as well as around immovable objects such as posts, trees, stones and the like removably mounted to a motorized mobile vehicle having such trimmer mounted thereon. More particularly, the invention includes a line trimmer including a novel controlled line feed for trimmers.

2. Description of the Prior Art

Line trimmers are well known some of which are hand carried while other larger units are mounted on a motorized vehicle. Vehicle carried vegetation trimmers are disclosed in the following Unites States Patents: U.S. Pat. No. 5,704,201 granted Jan. 6, 1998 to R. Van Vleet; U.S. Pat. No. 5,396,754 granted Mar. 14, 1995 to J. Fraley; U.S. Pat. No. 5,050,372 granted Sep. 24, 1991 to M. Heiskell; U.S. Pat. No. 5,040,360 granted Aug. 20, 1991 to J. Meehieder; U.S. Pat. No. 4,996,830 granted Mar. 5, 1991 to T. Davison; U.S. Pat. No. 4,901,508 granted Feb. 20, 1990 to D. Whatley; U.S. Pat. No. 4,873,818 granted Oct. 17, 1989 to A. Turner; U.S. Pat. No. 4,802,327 granted Feb. 7, 1989 to C. Roberts; and U.S. Pat. No. 3,729,910 granted May 1, 1973 to E. Hardee.

It is known from the foregoing to mount the cutting unit on the vehicle by attaching it to a three point hitch as taught in U.S. Pat. No. 5,050,372, by a linkage system as taught in U.S. Pat. No. 5,704,201, or by a boom as taught in U.S. Pat. No. 5,396,754.

The prior art devices generally require a lot of operator manipulation of the vehicle and/or the cutter assembly mounted thereon and in many cases cannot even attempt to perform the task.

SUMMARY OF INVENTION

The present apparatus overcomes some operator manipulation requirements and other problems associated with the prior art devices by having a cutter head mounted on an open frame and mounted thereon by linkage means whereby it is moveable relative thereto against a spring bias. The frame is preferrably generally 'U' or 'V' shaped (but need not be so) and the cutter head is located in the open bite portion of the 'U'. The cutter head maybe supported on the ground by caster wheels and pivotally attached in such a manner as to allow it to follow the land surface contour. The cutter maybe a blade (or blades) that maybe rigid, or yieldable when striking an immovable object and it maybe surrounded by an annular guard fixedly secured to the cutter support.

The instant invention provides a vegetation trimmer unit having an open generally 'U'-shape frame with a power driven string line cutter mounted thereon by a linkage mechanism that permits the cutter head to move to the frame against a spring biasing the cutter head in reaction outwardly away from the frame. The unit is suspendable ram the free outer end of an extendible and retractable vehicle mounted boom. An actuator located on the vehicle is use to dispense sequentially predetermined lengths of line from the string line cutter.

Moreover the invention is a mountable trimmer unit, attachable to the free end of a vehicle mounted boom. A rigid frame having means on the underside thereof such as one or more wheels, rollers, runners, or floating balls, for glidingly supporting the trimmer unit on the surface of the ground at a selected level. A cutter head having a power driven vegetation cutter such as a string trimmer extends therefrom. Linkage means connected to the frame and the cutter head are used to mount the cutter unit on the frame for movement relative thereto and allow the cutter head to be pivoted at an angle in the horizontal plane. Means carried by the frame such as hydraulic units, electric solenoids, air operated solenoids, or mechanical devices such as cams and springs are connected to the cutter head control the movement of the cutter unit relative to the frame.

The cutter head mounting linkage means has springs attached thereto such that the cutter head is biased to an extended or forward at rest position. A cutter element guard, carried by the cutter head, strikes an object when the trimming unit is moving and moves the cutter head, relative to the frame, against the pressure exerted by the springs. Moreover, the cutter head and optionally the cutter guard extend outwardly past the frame whereby up to 50% of the rotary cutter head projects past the frame in order to permit close trimming of vegetation around obstacles. As the trimming unit continues moving the cutter head is deflected by the obstacle toward the web portion of the 'U' shape frame. The spring bias returns the cutter head to its original at rest position when the cutter head has passed by the obstacle. The cutter head is further movably mounted by being pivoted for movement about a horizontal axis so that it can be controllably tilted to cut on an incline or decline.

The cutting element guard is a wheel like member journaled on the cutter head and thus is able to roll on the outer peripheral surface of a tree trunk, a vertical post or the like causing the cutter head to move laterally around the immovable object while the cutter element trims the vegetation around such object.

The frame, on which the cutter head is mounted, is controllably rotatable about a vertical axis with such operation being controlled by the operator.

Apparatus constructed in accordance with the present invention can incorporate one or more or all of the foregoing features or various combinations or sub-combinations thereof.

A principal object of the present invention is to provide a removable trimmer unit that is mountable on a motorized vehicle and wherein the trimmer unit has a frame with a power driven cutter head movably mounted thereon.

A further object of the present invention is to provide a vegetation trimmer capable of cutting around obstacles with a minimum of operator effort.

A further principal object is to provide a motorized mobile vehicle apparatus for mowing and/or trimming around large fields of grassland such as parks, playgrounds, boulevards, road allowances or the like and which has mounted thereon a power driven trimmer unit capable of cutting around trees, posts, rocks and the like immovable objects and with minium operator manipulation.

Another object of the present invention is to provide a trimming head having at least one me and preferably multiple lines automatically releasable therefrom positioned axially on a spindle.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 8 is an elevational view of the cutter head showing a string mounting reel and string feed mechanism;

FIG. 11 is an exploded view of the cutter shaft and its attachment to the motor shaft;

FIG. 12 is a plan top view of the line feed latching plate;

FIG. 13 is a side view of the line feed latching plate;

FIG. 14 is a plan top view of the line cutter spool and hub;

FIG. 15 is a side view of the line cutter spool and hub;

FIG. 16 is a side view of a bowl mounting bolt;

FIG. 17 is a plan bottom view of a bowl mounting bolt;

DESCRIPTION OF THE PREFERRED EMBODIMENT

Figure 1:
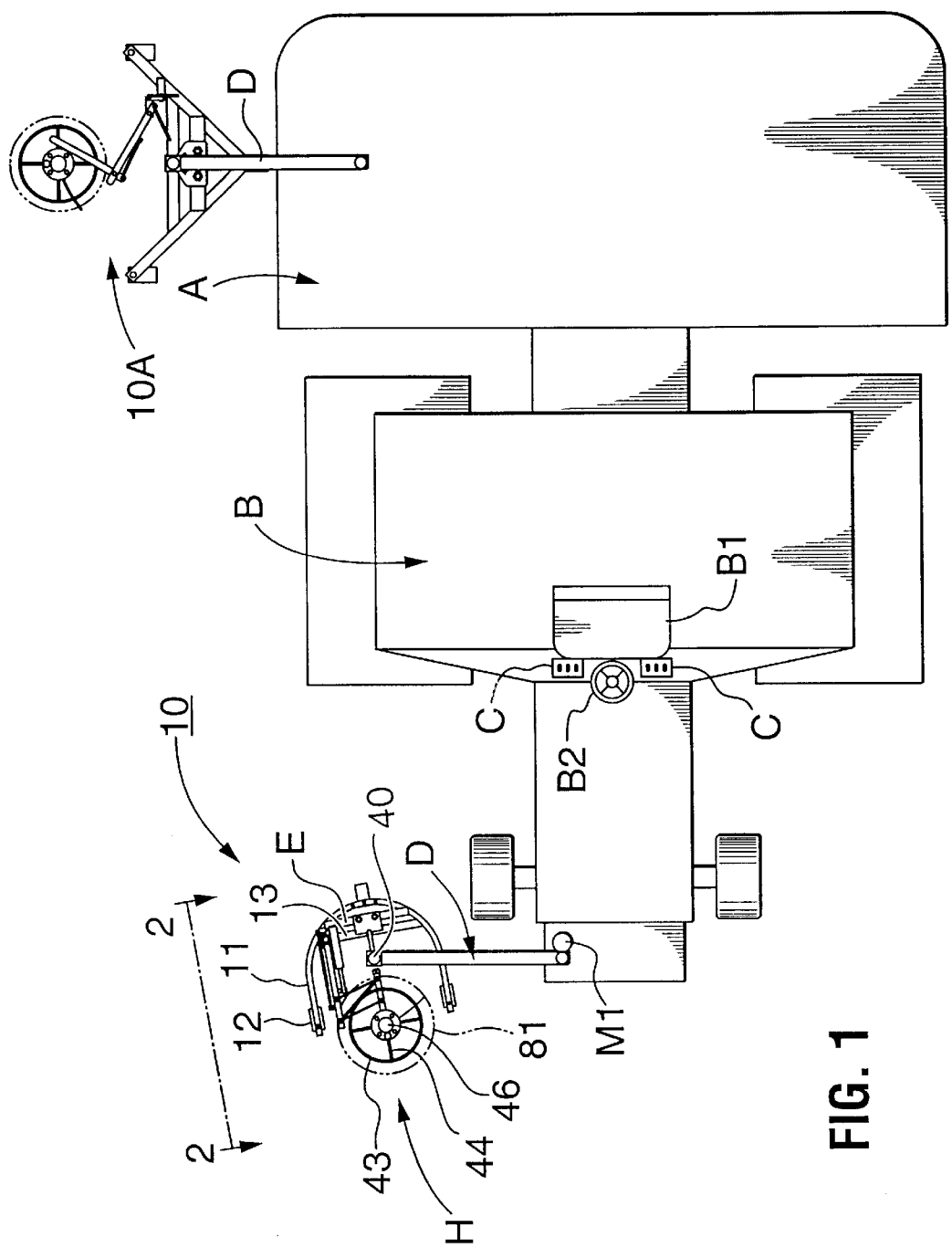
FIG. 1 is a plan view of a grass mowing apparatus having two trimmer units of the present invention depending from a respective one of a pair of booms.

Referring to the drawings illustrated in FIG. 1 is grass cutting mower A pulled by a tractor B having an operators station. The operators station includes a seat B1 for the operator, a steering wheel B2 for the operator to steer the tractor and a pair of trimmer control units C for the operator to manipulate respective ones of a pair of trimmer units designated 10 and 10A.

The foregoing is a removable mountable mowing and trimming apparatus for attachment to a tractor, zero turning radius mower, riding mower, truck or other powered vehicle for use in caring for large tracts of land and trimming around objects without having to dismount from the vehicle. The most versatile and widely used vehicle; however, is the tractor utilizing the string trimmer unit of the present invention mounted thereon. The trimmer unit preferably is mounted on the side o the vehicle but it may if desired be mounted on the front or rear.

The trimmer units 10 and 10A are essentially the same differing one from the other mainly in the linkage means by which the cutter head is movably mounted on the frame with one linkage means providing somewhat greater travel than the other in reciprocal movement of the cutter head. Although the trimmer unit of the instant invention utilizes a power head with a string trimmer, a power head utilizing one or more blades could also be used in the assembly for cutting dense vegetation, shrubs and the like. It is contemplated that the blades can be mounted in the center to a spindle or one or more blades could be mounted to the edge of a hub or disc attached to the spindle.

Figure 2:
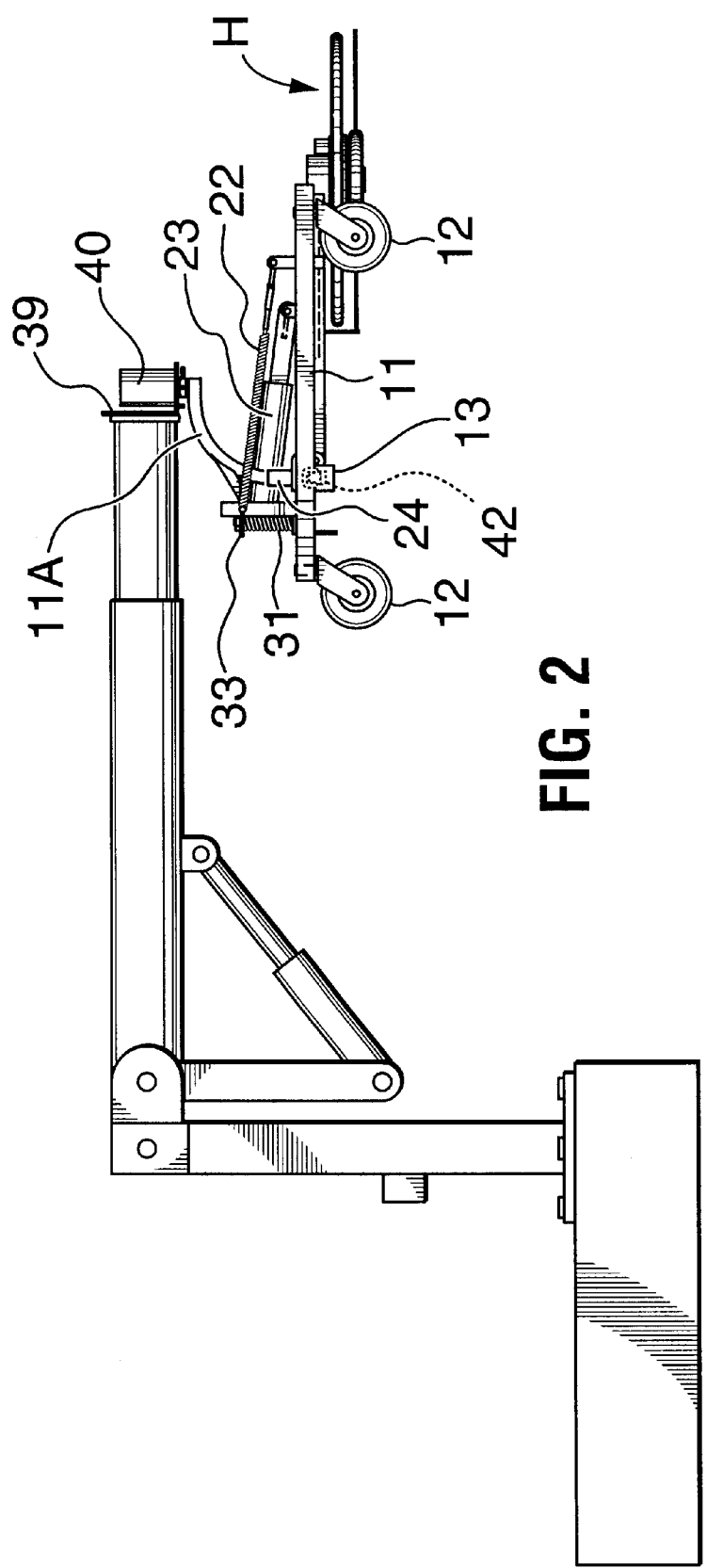
FIG. 2 is a diagrammatic elevational view illustrating one boom arrangement with a trimming unit of the present invention depending from the free outer end thereof.
Figure 3:
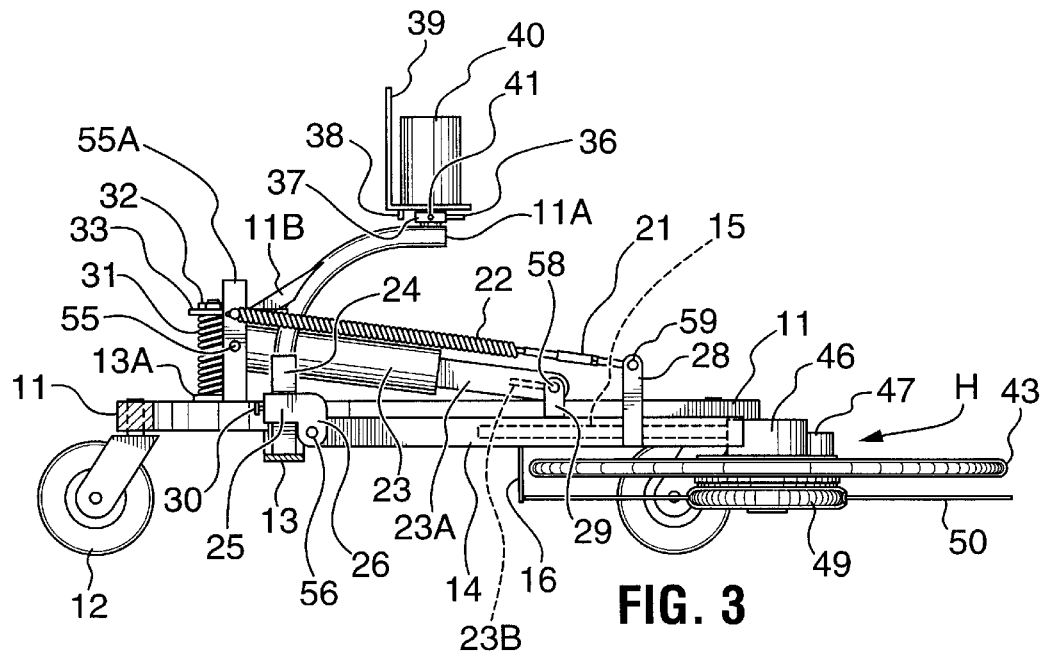
FIG. 3 is an elevational view of the trimmer unit seen in FIG. 2 and taken essentially along line 2—2 of FIG. 1 but on a larger scale.
Figure 4:
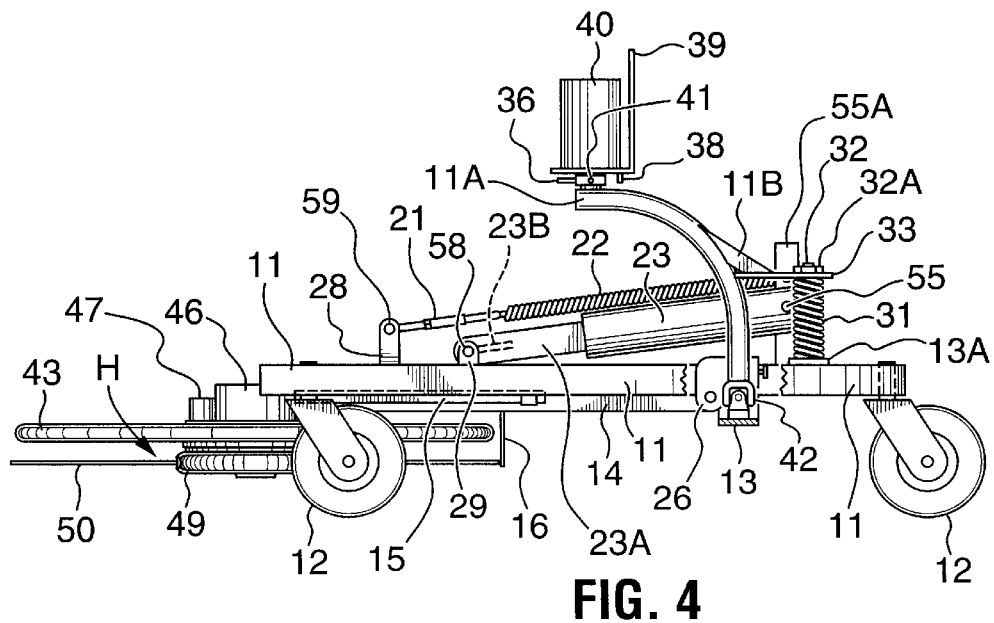
FIG. 4 is essentially the same as FIG. 3 but taken from the opposite side of the trimmer unit and with selected portions in section.

Each one of the trimmer units 10 and 10A are mounted on the mobile apparatus by a boom D. The trimmer unit 10 is shown mounted on the front end of the tractor and the other unit 10A is mounted on one side of the mower. There may be only one trimmer unit, or more located where deemed applicable and/or desirable for the task at hand. The boom(s) maybe of various configurations and variously mounted. The boom by way of example maybe a single stick type as shown in FIG. 1 or a telescopic type as shown in FIG. 2. In each case the boom is pivotally mounted for movement about a vertical axis and rotated by a motor Ml via a suitable drive and speed reduction unit.

Figure 7:
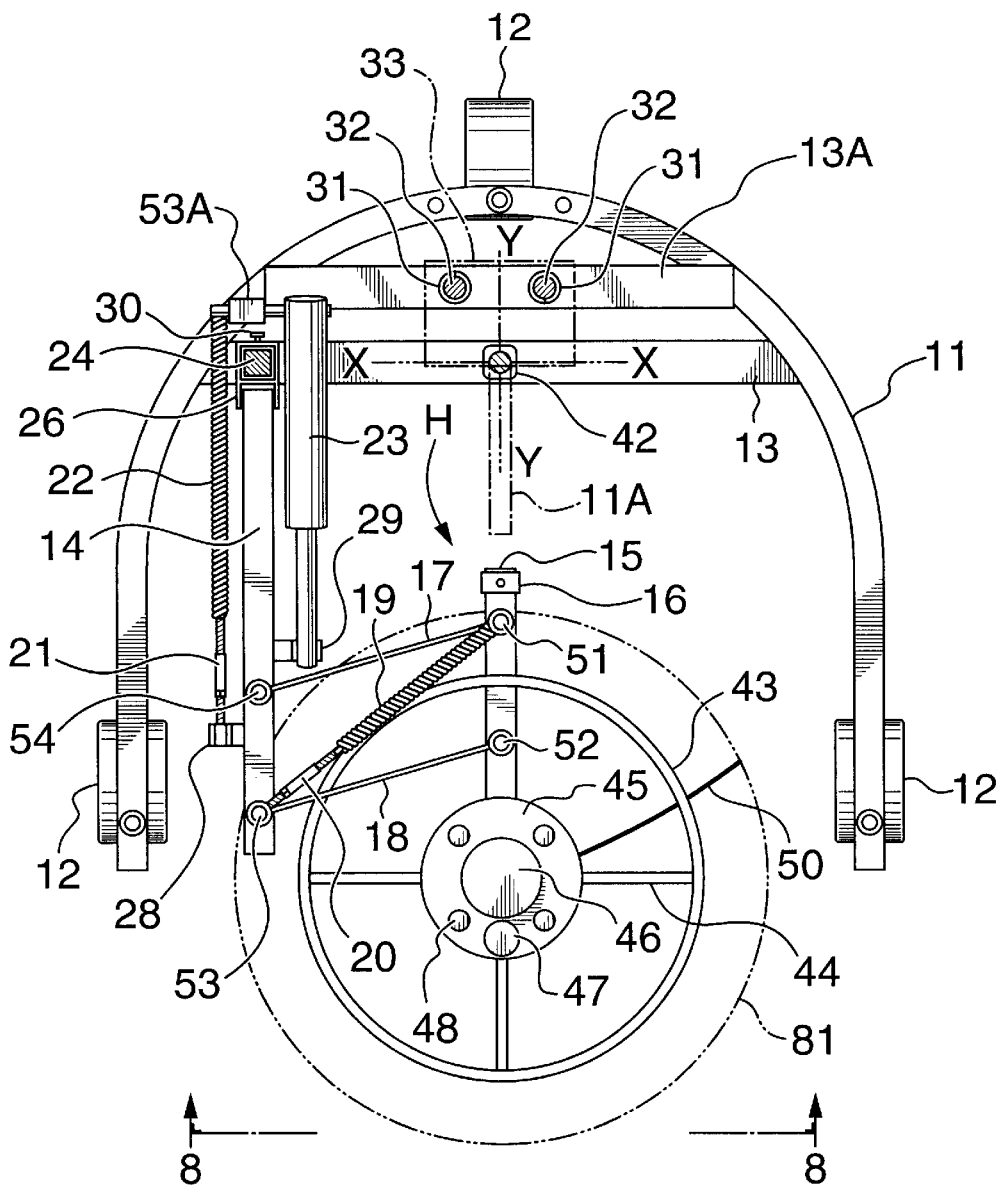
FIG. 7 is a top plan view of the trimmer unit mounted on the front end of the vehicle.

The trimmer units 10 and 10A each have a frame 11 suspended by a curved post 11A from the free outer end of the vehicle mounted boom. The post is connected to a cross member 13 on the frame 11 by a universal joint 42 that allow the frame to pivot about mutually perpendicular axes designated X—X and Y—Y as best illustrated in FIG. 7. The pivotal movement is retained by a pair of coil compression springs 31 that are laterally off-set from the axes X—X and Y—Y. The compression springs 31 are interposed between a plate 33 secured to and protecting from the post 11A and a cross-member 13A secured to and located on the top side of the frame 11. The springs are located on respective pairs of bolts 32 each with a nut 32A to adjust the pre-loading of the compression springs. The frame 11 has caster wheels 12 depending downwardly for rollingly supporting the apparatus on the ground during use. Runners, skids, balls or the like maybe used in place of the casters to glidingly support the trimmer unit. A motor 40 on the end of the boom drivingly rotates the trimmer unit mounting post 11A about a vertical axis.

Carried by the frame 11 is a cutter head H comprising a mounting plate 45, a motor 46, at least one motor driven cutter element 50 and a cutter element guard 43. In a preferred embodiment, the cutter element 50 and guard 43 are positioned projecting outwardly past the frame 11. The cutter element in at least one embodiment comprises a string trimmer whereby the string can actually extend outward past the guard 43 exposing as much as 50% of the diameter of the cutting element to cut vegetation and even contact immovable objects without damaging them to remove all of the vegetation therearound.

Moreover, the cutter head is mounted on the frame 11 by a linkage system providing reciprocal movement of the cutter head in a direction toward and away from the apex of the frame and tilting movement about a horizontal axis. The mounting plate 45 is attached to the free outer distal end of a cutter head travel arm 15, that in the embodiment illustrated in FIG. 7, is connected by a pair of swing arms 17, 18 to a cutter head support arm 14. The support arm 14 is pivotally connected by a pin 56 to a lug 26 and is controllably movable about a horizontal pivot axis provided by pivot pin 56 to vary the tilt of the plane in which the string cutter element is located during operation. A tension spring 22 counter balances the weight of the cutter head so that it can be free floating and as will be seen hereinafter this floating action can be permitted by the use of a lost motion connection between a hydraulic cutter head tilt cylinder and the cutter head support arm 14.

An important feature of the present invention is the incorporation of a means of biasing, such as the tension spring 19, which biases the cutter head to a forward at rest position as seen in FIG. 7. FIG. 7 shows that the swing arms 17 and 18 are connected at one end by respective pivot pins 51 and 52 to the cutter head travel arm 15 and at the other end by respective pivot pins 54 and 53 to the cutter head support arm 14. This parallelogram arrangement allows the cutter head to move back from the position shown in FIG. 7 in a direction toward the cross member 13 on the frame 11 against the force of the tension spring 19. The tension spring is shown connected at one end to the pivot pin 51 and at the other end via a variable length turn buckle 20 to the pivot pin 53 and obviously other arrangements can readily be used to accomplish the same result. Also obviously the pair of swing arms can be replaced by a single lever arm and biased by spring means suitably connected thereto.

Figure 5:
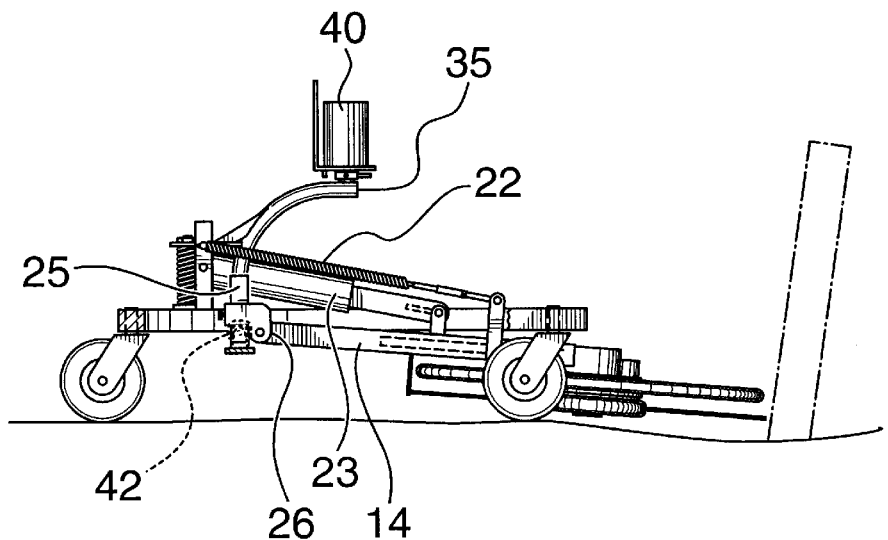
FIG. 5 is the same as FIG. 3 but in which the cutter head is tilted for cutting on a decline around a post.
Figure 6:
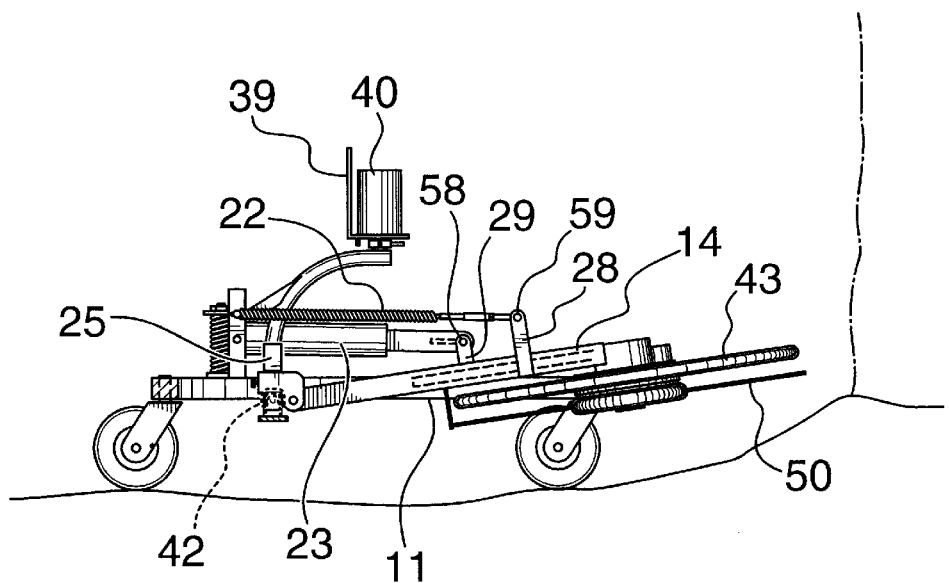
FIG. 6 is the same as FIG. 3 but in which the cutter head is tilted for cutting on an incline for cutting around the base of a tree.

The cutter head support arm 14 is pivotally attached by the pin 56 to the lug 26 that is on a height adjustment bracket 25. The bracket 25 is slidably movable along a stand post 24 and is lockable onto the post at various positions there along by a means for holding such as a locking bolt 30. Means for pivoting such as a hydraulic piston, or as shown in the drawing an electric linear actuator 23 is connected at one end via a pin 58 and lug 29 to the cutter head support arm 14 and at the other end via pin 55 to a post 55A on the frame or if desired to the bracket 25 on the post 24. The operator, via toggle switch TS1 on the control panel C, is able to tilt the cutter head from one to the other of an incline a shown in FIG. 6 to a decline position as shown in FIG. 5 to trim around various obstacles.

The weight of the cutter head is counter balanced by a weight or preferably the tension spring 22 anchored at one end to the post 55A, or if desired to the bracket 25 or some other suitable location on the frame, and at the other end it is connected, via a turnbuckle 21, pin 59 and lug 28, to the cutter head support arm 14. A slot shown in phantom lines and designated 23B can be provided in the stem 23A of the linear actuator 23 for the pin 58. This slot will provide a lost motion connection whereby the cutter head can be free floating to skip over small obstacles or ground undulations. It is contemplated that other means for providing for a free floating cutter head could also be used therewith.

In the forgoing embodiment, the cutter head is connected to the frame by links in a parallelogram arrangement but a single lever, as mentioned, could be used and pivotally connected adjacent one end thereof to the support arm 14 for swinging movement about a vertical axis and at the other end to the travel arm 15. In the embodiment illustrated in FIGS. 7A and 7B the mounting linkage has a second pivotally connected lever arm and thereby increases the extend of travel of the cutter head in its reciprocal movement from a fully extended to a fully retracted position.

Figure 7A:
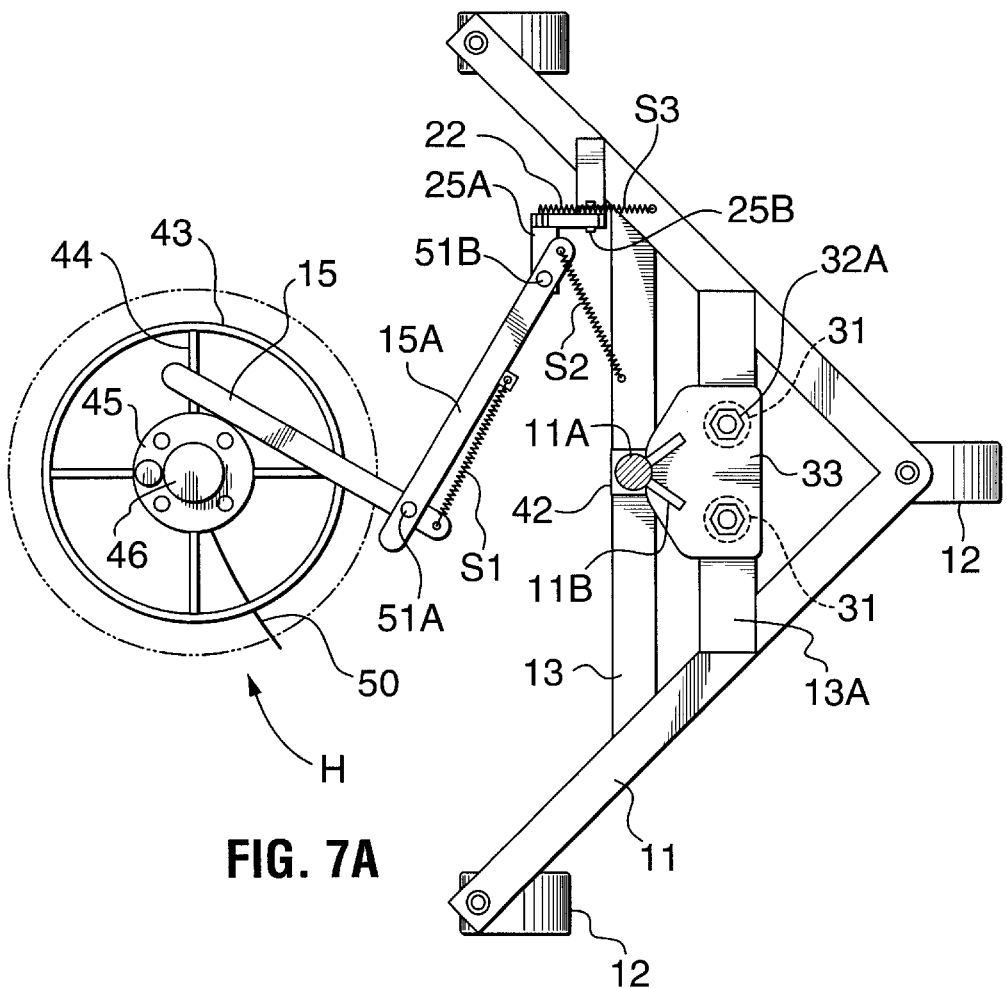
FIG. 7A is a top plan view, similar to FIG. 7, illustrating modifications to the mounting of the cutter head on the frame.
Figure 7B:
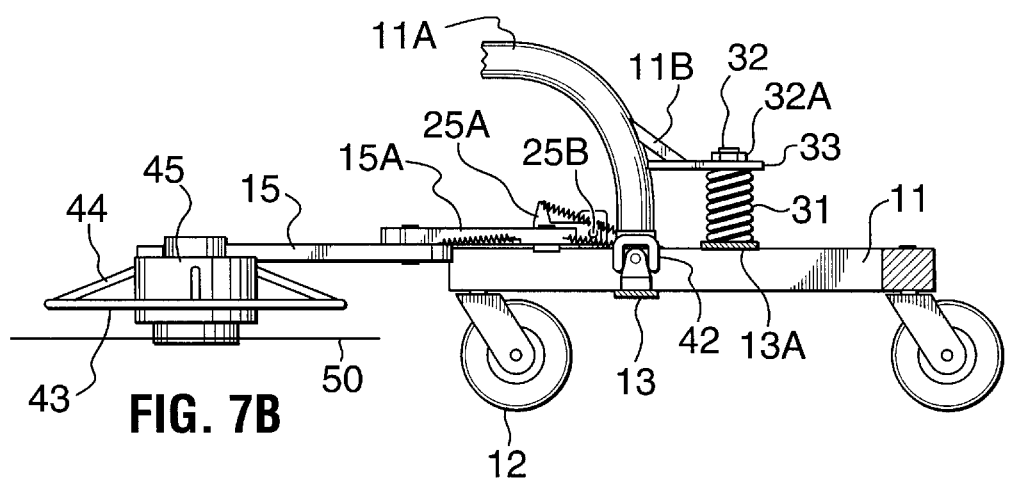
FIG. 7B is a side elevational view of FIG. 7A.

Referring to FIGS. 7A and 7B, the cutter head travel arm 15 is shown pivotally connected by a pin 51A to a link arm 15A which in turn is pivotally connected to a bracket 25A by a pin 51B whose pivot axis is vertical. The bracket 25A is connected to the frame 11, or alternatively the previously described adjustable bracket 25, by a pivot pin 25B whose pivot axis is horizontal. A first tension spring S1 is connected at opposite ends respectively to the lever arm 15A and a portion of lever arm 15 projecting beyond the pivot pin 51B and biases the cutter head forwardly away from the frame. A second tension spring S2 connected at opposite ends respectively to the frame and an extension of the lever arm 15A projecting beyond the pivot pin 51A does the same. Preferably less force is required to move the arm 15 about pivot 51A than arm 15A about pivot pin 51B. A third tension spring S3 connected respectively at opposite ends to the bracket 25A and the frame 11 counter balances the weight of the cutter head about the horizontal pivot axis of pivot pin 25B. The bracket 25A can be mounted on the post 24 for selectively vertically adjusting the position of the cutter head. This two lever folding linkage substantially increases the travel during reciprocal movement of the cutter head over that of the effectively a single lever illustrated in FIG. 7 without increasing the spacing between the outer free ends of the arms of the 'V' shaped frame i.e. the width of the frame.

The curved post 11A is connected at one end to an output shaft of an electric 12V DC gear motor rotary actuator 40 mounted on a boom attachment or mounting bracket 39 and at the other end to the universal joint 42 or other means rotary connecting means such as a flexible cable linkage (not shown). A hub 37 is connected to the rotary actuator shaft and a means for stopping defining a stop pin 36 thereon engages a projection 38 on the boom mounting bracket 39 to limit rotation of the trimmer unit.

The curved post 11A has a plate 33 secured thereto and projecting therefrom with reinforcement being provided by gusset plates 11B. The compression springs 31 on the variable length rods or bolts 32 stabilize the cutter head in a generally horizontal attitude on the ground and the nuts 32A permits adjustably varying the preloading on the springs.

Figure 9:
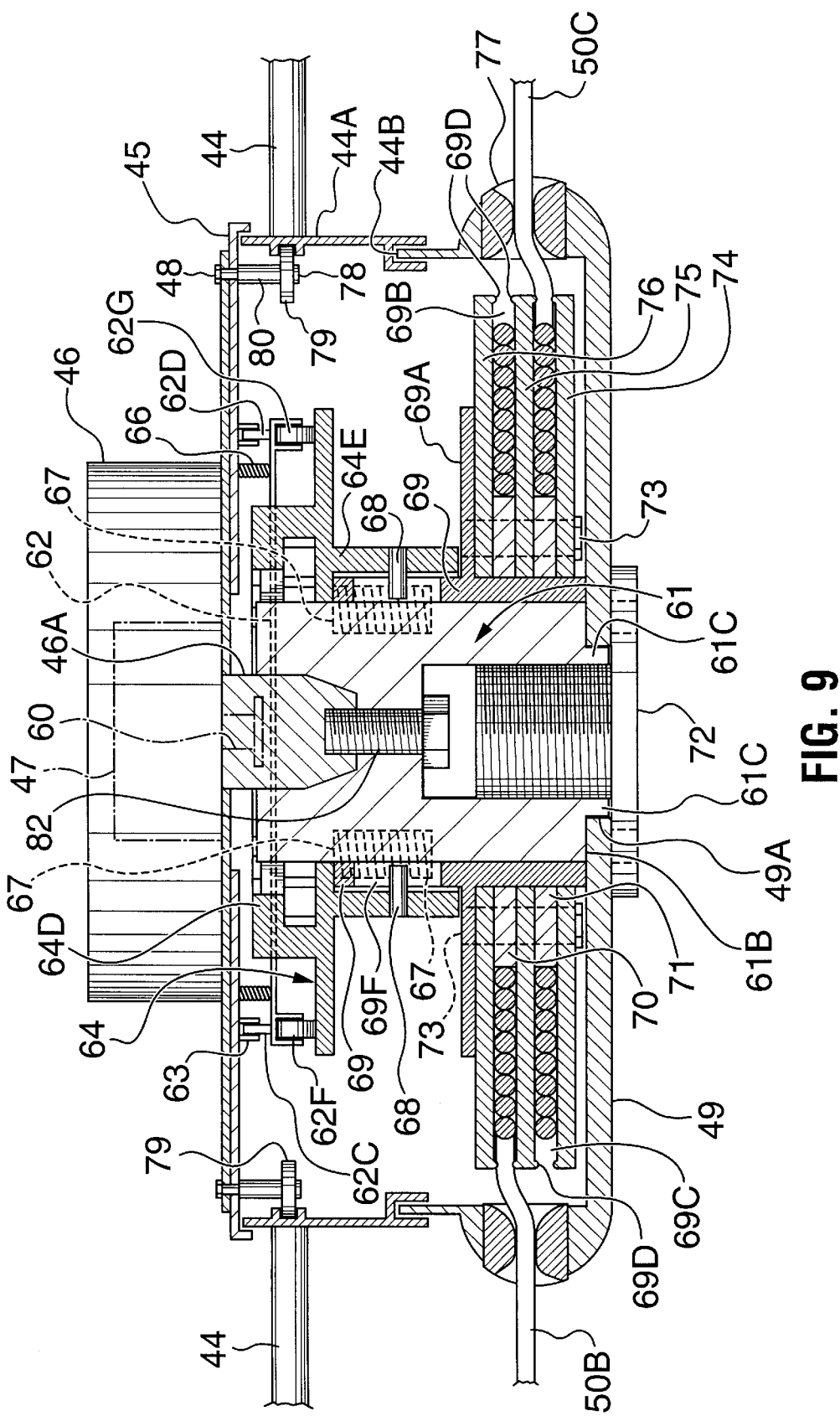
FIG. 9 is a cross-section essentially along line 8—8 of FIG. 7 and on a much larger scale to illustrate details of the string mounting reel and string feed mechanism.
Figure 10:
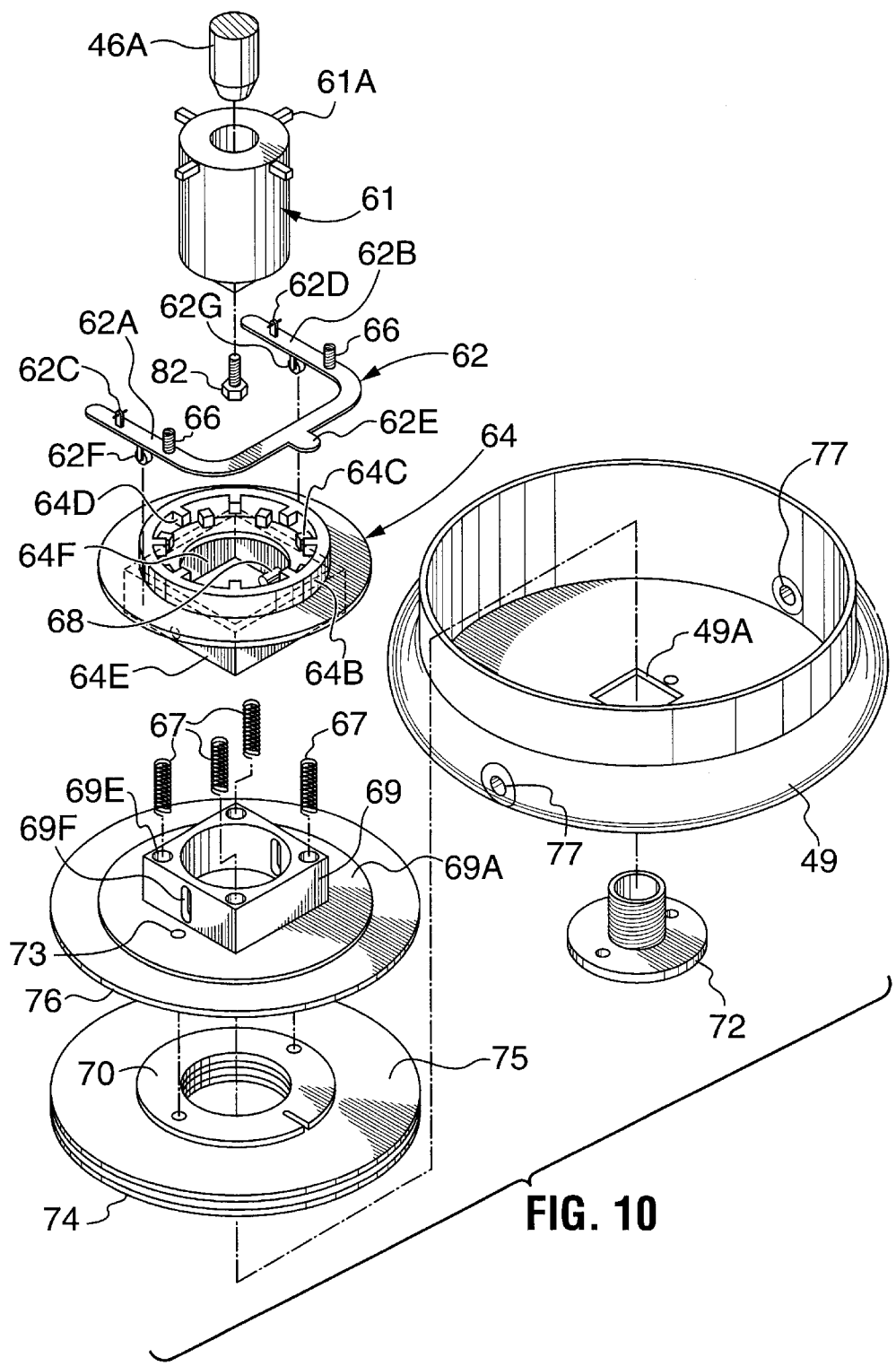
FIG. 10 is an exploded view illustrating components of the line reel and the line feed mechanism.
Figure 18:
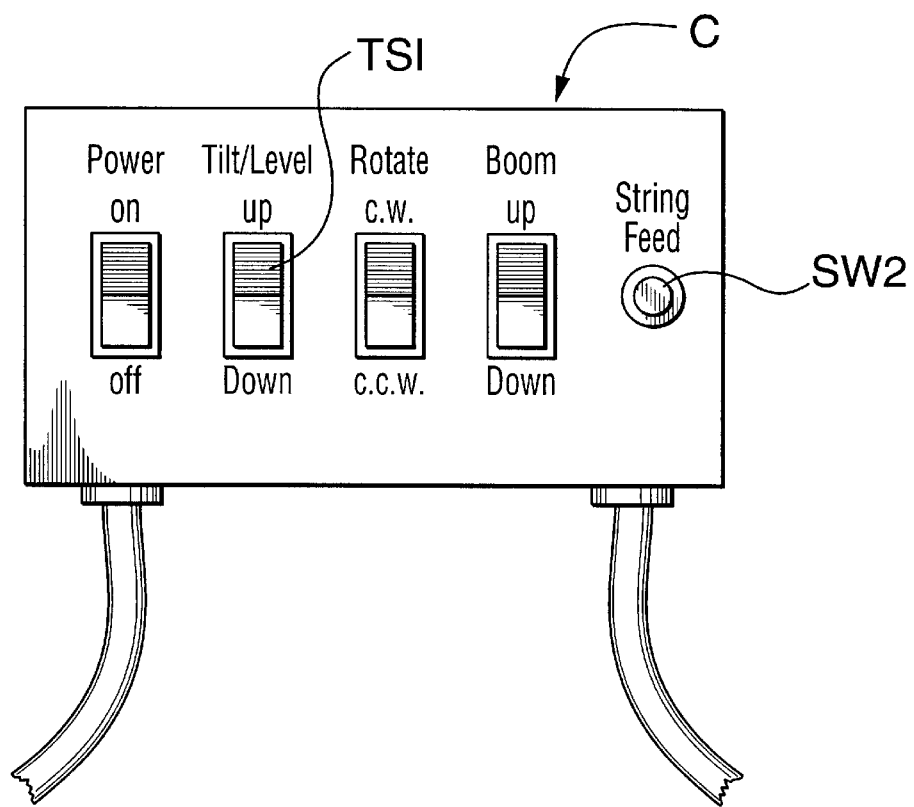
FIG. 18 is a front view of the operator's control panel mounted on the tractor for the operator to controllably move one of the trimmer units.

The cutter head has a variable speed hydraulic motor 46 (500 to 4000 RPM and is powered from a emote outlet on the tractor) mounted on the power unit plate 45 that is suitably fixedly secured to the cutter arm 15. The motor 46 as best shown in FIGS. 9 and 10, has a drive shaft 46A with a tapered lower end on which there is mounted a cutter shaft 61 that is retained thereon by a threaded stud 82. The cutter shaft has plurality of outwardly directed projections or teeth 61A space apart from one another circumferentially around the shaft. On the bottom end there is a ledge or end face 61B and a squared projection 61C that provides a mounting for a bowl type spool cover 49. A spool hub 69 is mounted on the cutter shaft and includes an outwardly directed flange 69A intermediate the ends thereof. A sandwich of plates 74, 75, and 76 and spacers 71 and 70 thereinbetween are mounted on the hub and secured by studs 73 threaded into apertures in the flange 69A. The plates and spacers provide spools 69B and 69C for respective string lines 50B and 50C. The spool widths are such that the string line is wound as a single spiral on the respective spools. The edges of the plates are rounded as for example indicated by reference 69D to prevent cutting into the string line.

The spool bowl like cover 49 has a square hole 49A in the bottom thereof which mates with the hub square 61C and is retained securely in position by a threaded stud 72. This stud has left hand treads for a counter clockwise rotating cutter. The bowl cover has a pair of diametrically opposed apertures each with a wear resistant insert 77 therein that also protects the string line that extends there through as clearly seen from FIGS. 8 and 9.

A latch plate 64, having a central aperture, is mounted for limited reciprocal movement on the cutter shaft 61 at a position under the teeth 61A projecting therefrom. The latch plate has an upwardly projecting sleeve 64B that has on the internal surface thereof a lower first series 64C of spaced apart cogs or lugs and an upper second series 64D of cogs or lugs. The lugs in the upper series 64D are off-set from those in the lower series 64C in a direction circumferentially around the cutter shaft.

The latch plate 64 is spring biased by compression springs 67 projecting upwardly from each of respective ones of four recesses 69E in the spool hub 69. The springs engage the latch plate biasing it upwardly so that the teeth 61A on the cutter shaft are located between the lugs in the lower series 64C on the latch plate. The latch plate 64 has a downwardly projecting sleeve 64E providing a female socket 64F that receives therein the upper, square in outline, portion of the spool hub 69. This square portion of the hub 69 has a pair of diametrically opposed slots 69F. Set screws 68, threaded into apertures in the latch plate sleeve 64E, slide in the slots 69F to limit the amount of reciprocal movement of the latch plate 64. When the latch plate 64 is moved to its lowermost position, (i.e. when the set screws 68 engage the lower end of the respective slot 69F associated therewith), the teeth 61A on the cutter shaft are located between the lugs of the upper series 64D. Since these lugs, as previously mentioned, are circumferentially off-set from the lower series, the latch plate is allowed to rotate a predetermined distance on the cutter shaft i.e. the amount of off-set of the cogs of the upper and lower series. Moving the latch plate up and down, i.e. reciprocally from one limit position to the other on the cutter shaft allows the hub to move in a step wise fashion and thereby dispense the string lines on the respective spools in increments. The amount of line dispensed in each increment will be determined by various factors that include the line helical diameter on the spool and the circumferential spacing of the lugs in the respective upper and lower series 64D and 64C.

The string lines on the spools can be dispensed from a remote location by providing means to move the latching plate 64 downwardly against the force of the compression springs 67. In the embodiment herein this can be accomplished by actuating an electric solenoid 47 that is mounted on the power unit plate 45. This is done by the vehicle operator flicking a switch SW2 on the operator control panel C and thereby causing a plunger 60 on the solenoid to move a trip lever 62 that is pivotally mounted and comes into engagement with the latching plate. The trip lever is a bifurcated or wishbone shaped member having legs 62A and 62B that are pivotally attached adjacent the free outer ends thereof by respective pins 62C and 62D to lugs 63 on the underside of the power unit plate 45 and a stem 62E that the solenoid plunger 60 strikes. The legs 62A and 62B have journalled thereon respective rollers 62F and 62G that rollingly engage the upper surface of the latching plate 64 when the solenoid plunger 60 forces the lever 62 down. Tension springs 66 anchored at opposite ends respectively to the power unit plate 45 and the lever 62 retains the lever in an upper position such that the rollers 62F and 62G are normally disengaged from the latching plate.

The string line cutter cuts an area within an outer periphery designated 81 in FIGS. 1 and 7 and this is defined by a knife cutter 16 mounted on and projecting downwardly from the travel arm 15 to cut the string line. The cutter 16 is movable along the arm and is anchored thereto at the desired position by a set screw or locking pin 57.

The string line is prevented from winding around objects that it may strike by a guard ring 43 that engages the object. The guard ring 43 is attached to the outer ends of spokes 44 that radiate outwardly from a hub 44A. The hub 44A is journalled, by means of rollers 79, spacers 80 and mounting bolts 48, for rotation on the power unit plate 45. The guard hub 44A has a groove 44B on the lower periphery thereof that receives therein the upper edge of the spool cover bowl 49. The guard ring being rotatable can readily roll around the outer periphery of a tree trunk, post or other such object during trimming around the same.

Figure 19:
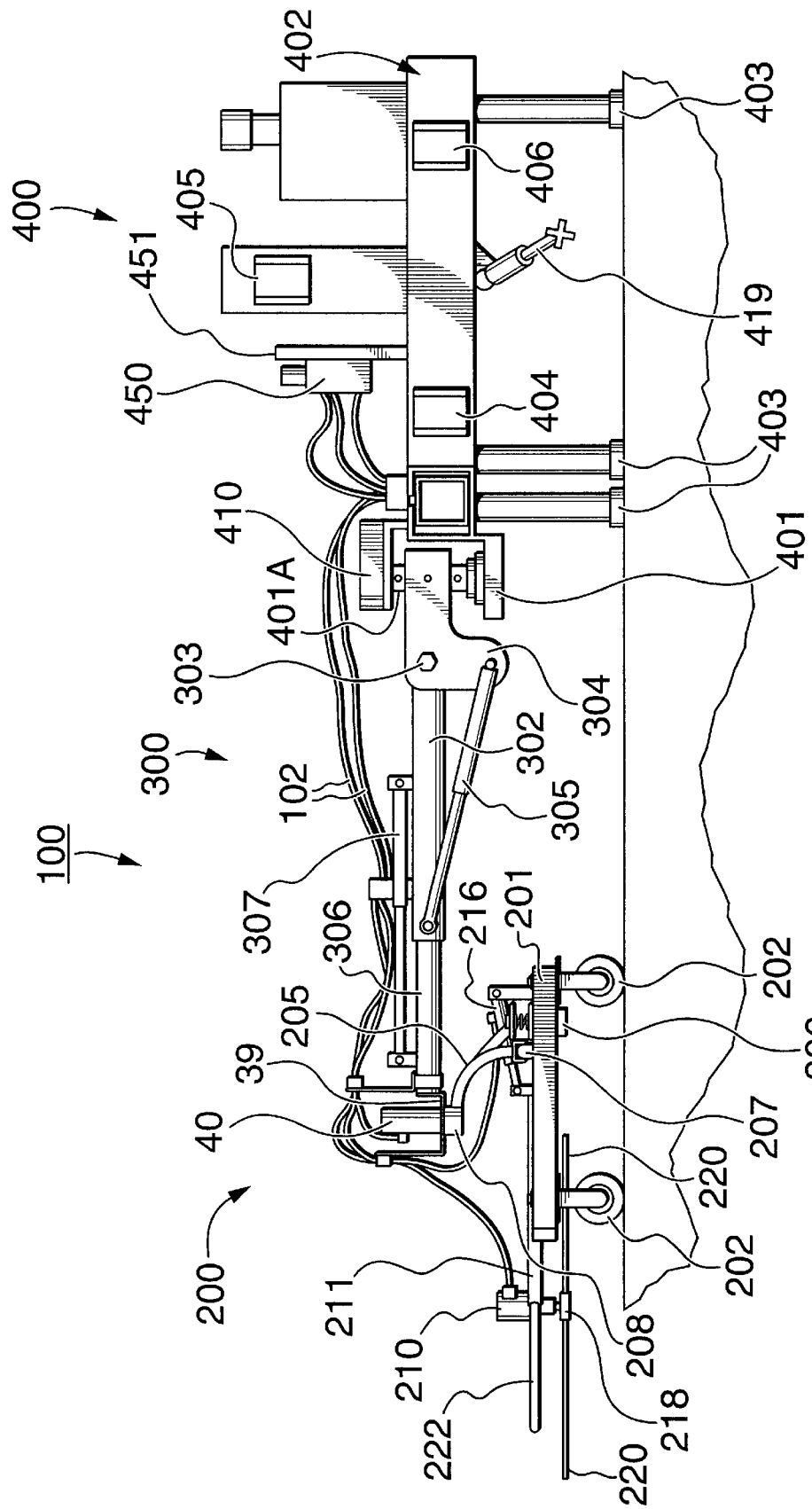
FIG. 19 is an elevational view illustrating details of another boom and support stand with a trimmer unit connected to the boom.
Figure 20:
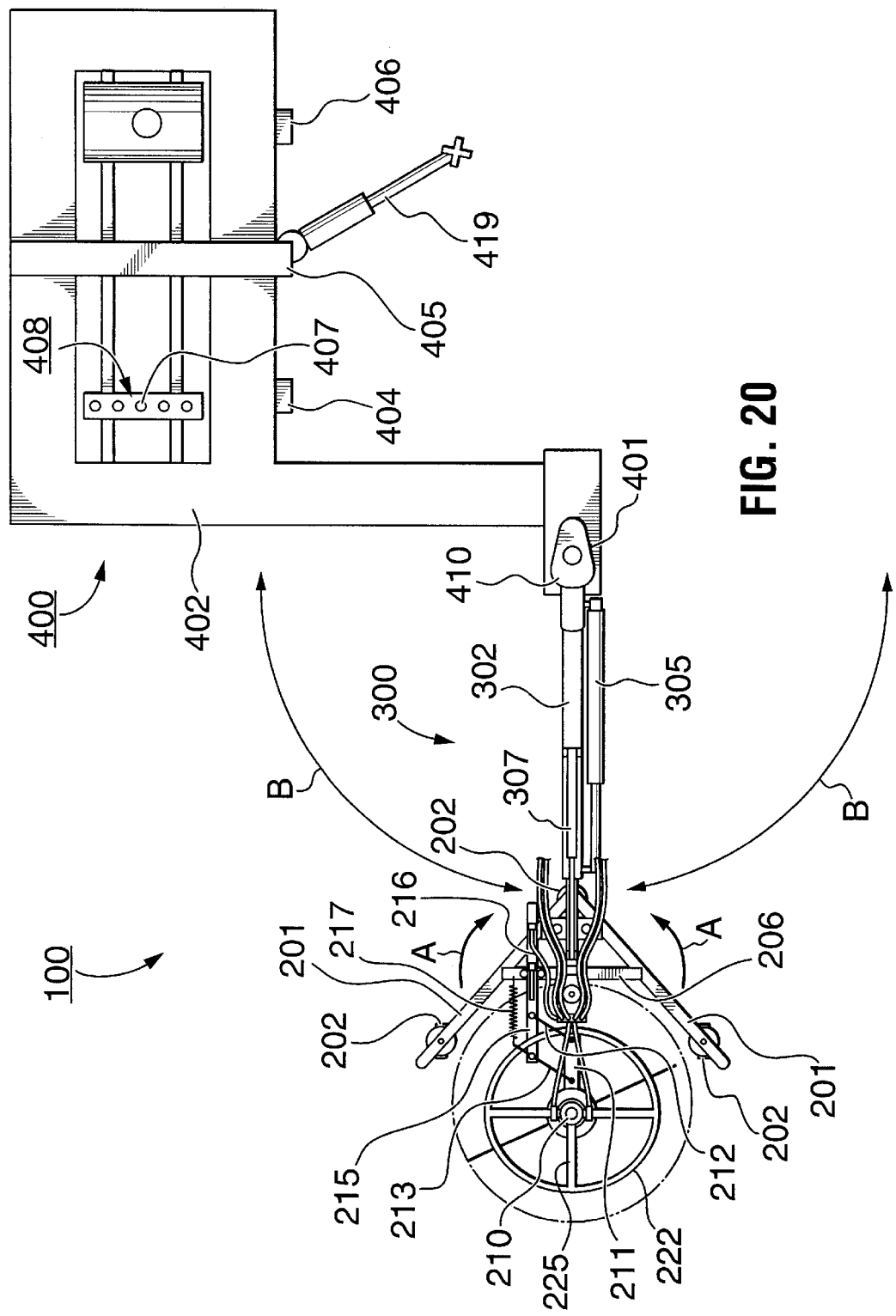
FIG. 20 is a top plan view of the apparatus shown in FIG. 19.
Figure 21:
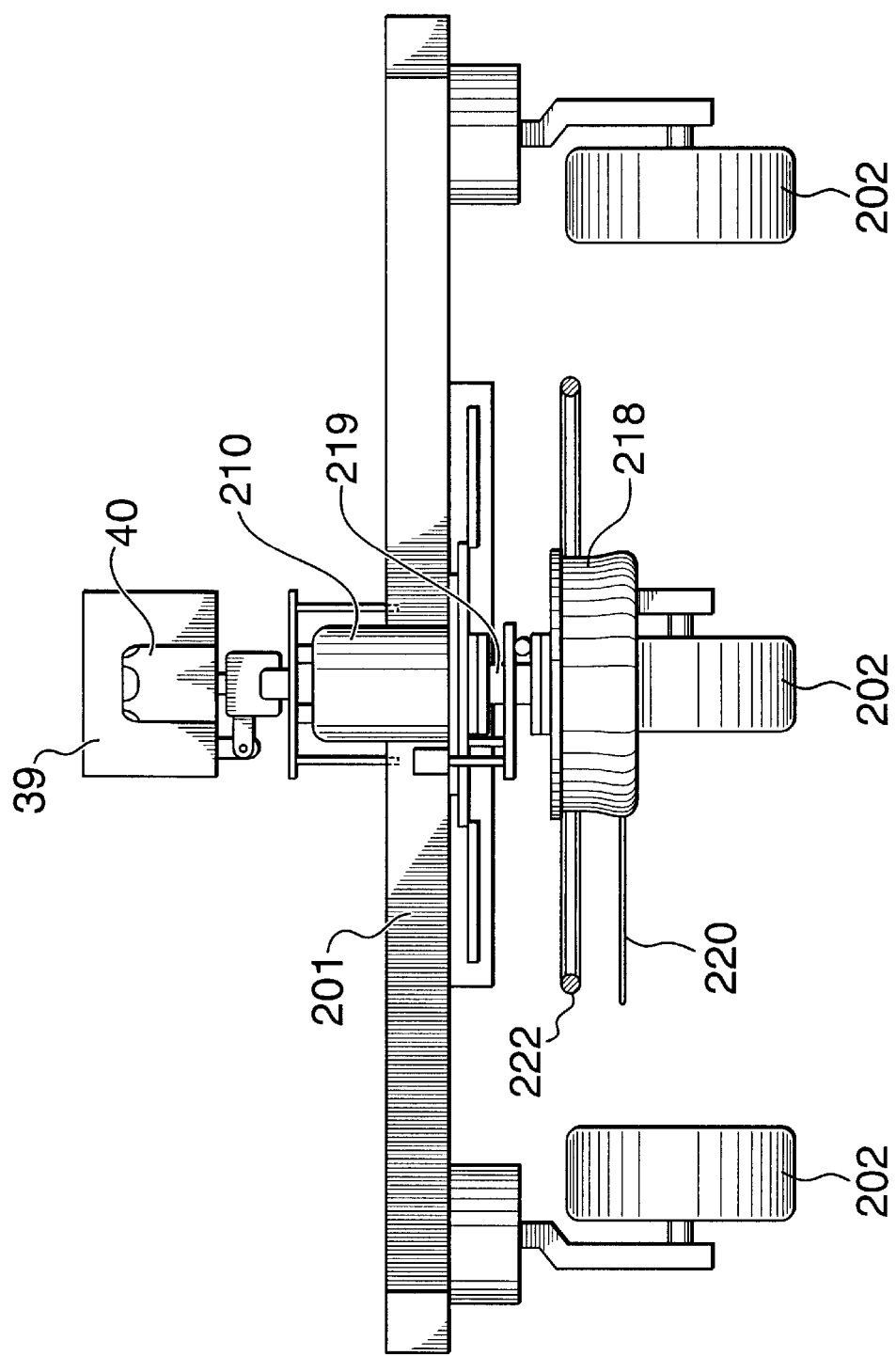
FIG. 21 is front elevational view of the trimmer unit shown in FIGS. 19 and 20 less the storage stand.

Referring now to FIGS. 19 to 21 there is illustrated an apparatus 100 comprising a power driven vegetation trimmer 200 mounted on the free outer end of a boom 300 that is attached to a storage stand and tractor hitch mount 400. The trimmer 200 comprises a 'V' shaped frame 201 rollingly spaced apart from and supported on the surface of the ground by three caster wheel units 202 and a trimmer unit that is movably mounted on the frame. Alternate means for supporting including skids can be used in place of the caster wheels. Two of the caster wheel units 202 are located at the tips of the frame and one at the apex. However, the support for the proximate portion of the frame can be achieved by operation of the boom and is not essential to operation of the unit, but provides a more stable unit. The frame being open exposes the trimming unit making it easy for the operator to see while manipulating it to cut around tree trunks, posts and the like especially in view that up to 50% of the cutting head is capable of extending past the frame.

The trimmer 200 is suspended from the free outer end of the boom 300 by a curved arm 205 that is attached to a cross brace 206 on the frame by a universal joint 207. This universal joint allows the trimmer to follow the ground contour as it is moved along the ground. As noted previously a flexible cable power take off could be used in place of the universal joint assembly. The other end of the curved arm 205 is connect to a boom mounting bracket 39 by a suitable rotary coupling 208 that allows the arm 205 to pivot 360 degrees about a vertical axis as best shown in FIG. 19. The arm 205 is drivingly connected to a hydraulic motor 40 mounted on the boom mounting bracket 39. The trimmer can be controllably rotated from a remote location by an operator to trim around objects on the ground.

The trimmer unit that is movably mounted on the frame includes a hydraulic motor 210 attached to a cutter head travel arm 211 that is mounted on the frame 201 by a pair of swing arms 212, 213. The swing arms are pivotally connected via vertical pivot axes to a support arm 215 that is pivotally attached via horizontal pivot axis to the frame cross member 206. The support arm 215 is pivoted by a hydraulic cylinder unit 216 to change the inclination of a cutter element, (either string line or blade) that is driven by the hydraulic motor 210 to rotate in a generally horizontal plane. A spring 217 biases the cutter unit to a forward normal at rest position as viewed in FIG. 20.

A cutter head 218 is attached to the motor 210 drive shaft 219 and a string line 220 is shown extending outwardly from the cutter head. A trimmer guard ring 222 is mounted on the cutter head travel arm by plurality of spokes 225 and it may be fixed if desired or rotatably mounted as for example in a manner previously described with reference to FIGS. 8 and 9. The cutter head assembly could be utilized independently of the boon even with a independent power means such as an electric, gas, or diesel engine.

However, the preferred embodiment is attached to and powered by the vehicle engine.

The boom 300 has a main boom section 302 pivotally connected at one end thereof by a pivot pin 303 to a bracket 304. The boom section is pivoted about pin 303 by a power unit comprising a hydraulic cylinder unit 305 connected at opposite ends respectively to the bracket 304 and the boom section 302. A second boom section 306 is telescopically disposed in the boom section 302 and is movable relative thereto by a hydraulic cylinder power unit 307 connected at opposite ends to respective boom sections 302 & 306. The trimming attachment mounting bracket 39 is secured to the free outer end of the boom section 306.

The boom bracket 304 is vertically adjustably mounted on a shaft 401A on a bracket 401 that is secured to a rigid frame 402 of the support 400. The shaft 401A is drivingly connected to a hydraulic motor 410 mounted on the bracket 401. The frame 402 has support legs 403 projecting downwardly therefrom and they may be telescopic or foldable so as not to interfere during use of the apparatus. The frame 401 is attachable to a vehicle three point hitch at positions designated 404, 405 and 406 with such hitch being movable by a hydraulic cylinder unit designated 419 to raise and lower the support 400 when mounted on the vehicle.

The hydraulic motors 40, 210 and 410 and tilt cylinder 216 are controlled via lever type valves 407 located at an operator control station 408 on the support frame 402.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented herein above. Rather, what is intended to be covered is within the spirit and scope of the appended claims.

I claim:

1. A trimmer unit, attachable to the free end of a vehicle mounted boom, comprising:
   a rigid frame having means for glidingly supporting said trimmer unit on the surface of the ground;
   a cutter head having a power driven vegetation cutter;
   linkage means connected to said rigid frame and said cutter head permitting said cutter head to move relative to the rigid frame against means for biasing the cutter head in a direction outwardly away from said rigid frame;
   means carried by said rigid frame and connected to said cutter head for controlling movement of said cutter head relative to said rigid frame;
   said power driven vegetation cutter, during use, rotates in a generally horizontal plane and said means for controlling movement of the cutter head relative to said rigid frame comprises remotely actuated power means to controllably pivot the cutter head with respect to said horizontal plane,
   said power driven vegetation cutter including a power driven shaft, a reel mounted on said shaft and a string line wound said reel and having a free end portion extending therefrom, and
   said reel having a width approximately the same as but slightly greater than the diameter of said string line limiting said diameter of said string line to a single layer spiral winding on said reel.

2. A trimmer unit a defined in claim 1 wherein said rigid frame is an open frame permitting viewing the power driven vegetation cutter, by an operator at a position elevated relative to the rigid frame, during operation of the trimmer unit.

3. A trimmer unit as defined in claim 2 wherein said cutter head is mounted on a generally U-shaped rigid frame.

4. A trimmer unit as defined in claim 1 including a post member, a universal joint means connecting said post to said rigid frame, means to suspend said post from a vehicle mounted boom and power means drivingly connected to said post for rotating said post and said trimmer unit about a vertical axis facilitating trimming around immovable objects on the surface of the ground.

5. A trimmer unit as defined in claim 1 including actuating means to selectively actuate a string line dispensing means, wherein said actuating means is disposed at a location remote relative to said cutter head.

6. A trimmer unit as defined in claim 5 wherein said reel is rotatably mounted on said power driven shaft and wherein said string line dispensing means comprises a clutch means releasibly inter-engaging said reel and said power driven shaft.

7. The trimmer unit of claim 1, wherein said means for biasing comprises at least one spring.

8. A trimmer unit as defined in claim 1 including at least one caster wheel supporting said frame.

9. A trimmer unit as defined in claim 1, including means for providing a lost motion connection whereby said cutter head is free floating for skipping over small obstacles or ground undulations.

10. A trimmer unit as defined in claim 1, further comprising at least one caster wheel for supporting said shaped frame.

11. Apparatus for trimming vegetation comprising:
   a motorized self-propelled vehicle;
   an extendible and retractable boom controllably swingably mounted on said vehicle and having a free outer end;
   a trimmer unit comprising a rigid, open, generally U-shaped frame having means to glidingly support said U-shaped frame on the surface of the ground, a cutter head having a power driven cutter, linkage system means movably supporting said cutter head on said U-shaped frame for movement relative thereto providing reciprocal movement of said power driven cutter in a direction toward and away said U-shaped frame and for tilting movement about a horizontal axis, counterbalancing means carried by said U-shaped frame and connected to said linkage means for controlling movement of the cutter head relative to said U-shaped frame said linkage means permitting said cutter head to move relative to the U-shaped frame against means for biasing said cutter head in a direction outwardly away from said U-shaped frame to a forward at rest position;
   means suspending said trimmer unit from said free outer end of said boom;
   power means connected to said trimmer suspension means for controllably rotating said trimmer unit about a first vertical axis;
   said power driven cutter is a string line type cutter including means to controllably dispense sequentially predetermined lengths of the line from said string line type cutter; and said string line cutter including a power driven shaft and a reel mounted on said shaft for rotation therewith about a second vertical axis during operation of said string line cutter, wherein said reel has a width corresponding to but slightly greater than the diameter of the string line limiting said string line to a single helical winding on said reel.

12. The apparatus for trimming vegetation of claim 11 wherein said means suspending said trimmer unit from said boom comprises a post connecting to and depending from said boom, and universal joint means connecting said post to said rigid frame allowing said frame to follow the contour of the ground during movement of said boom relative to the ground.

13. The apparatus for trimming vegetation of claim 11, wherein said linkage system means comprises a mounting plate attaching to a free distal end of a travel arm connecting a pair of swing arms or a single lever arm to a support arm for controlled movement about a horizontal pivot axis for varying the tilt of the plane of said string line cutter.

14. The apparatus for trimming vegetation of claim 11, wherein said counter-balancing means comprises at least one spring.

15. The apparatus for trimming vegetation of claim 11, wherein said means for biasing is a tension spring.

16. The apparatus for trimming vegetation of claim 13, further including means for pivoting said cutter head connecting said support arm to a post on said U-shaped frame.

17. The apparatus for trimming vegetation of claim 16, wherein said means for pivoting said cutter head comprises a hydraulic piston or an electric linear actuator.

18. The apparatus for trimming vegetation of claim 11, including means for providing a lost motion connection whereby said cutter head is free floating for skipping over small obstacles or ground undulations.

19. The apparatus for trimming vegetation of claim 11, including at least one caster wheel supporting said U-shaped frame.

20. The apparatus for trimming vegetation of claim 11, wherein said power means comprises a motor mounted on said boom for rotating said trimmer unit.

21. Apparatus for trimming vegetation comprising:

a motorized self-propelled vehicle;

an extendible and retractable boom controllably swingably mounted on said vehicle and having a free outer end;

a trimmer unit comprising a rigid, open, generally U-shaped frame having means to glidingly support said U-shaped frame on the surface of the ground, a cutter head having a power driven cutter, linkage system means movably supporting said cutter head on said U-shaped frame for providing reciprocal movement relative thereto and counter-balancing means carried by said frame and connected to said linkage means controlling movement of the cutter head relative to said frame said linkage means permitting said cutter head to move relative to the frame against a means for biasing the cutter head in a direction outwardly away from said U-shaped frame;

means suspending said trimmer unit from said free outer end of said boom;

power means connected to said trimmer suspension means to controllably rotate said trimmer unit about a first vertical axis;

said power driven cutter is a string line type cutter including means to controllably dispense sequentially predetermined lengths of the line from said string line type cutter;

said power driven cutter includes a power driven shaft and a reel mounted thereon for rotation about a second axis during operation of said string line type cutter, wherein said reel has a width corresponding to but slightly greater than the diameter of the string line limiting said string line to a single helical winding on said reel; and said power driven shaft includes clutch means controllably releasably inter-engaging said power driven shaft and reel for selectively dispensing line from said reel during trimming including means on said vehicle to selectively actuate said clutch means.

22. The apparatus for trimming vegetation of claim 21, wherein said linkage system means comprises a mounting plate attaching to a free distal end of a travel arm connecting a pair of swing arms or a single lever arm to a support arm for controlled movement about a horizontal pivot axis for varying the tilt of the plane of said string line cutter.

23. The apparatus for trimming vegetation of claim 21, including means for providing a lost motion connection whereby said cutter head is free floating for skipping over small obstacles or ground undulations.

24. The apparatus for trimming vegetation of claim 21, including at least one caster wheel supporting said U-shaped frame.

25. The apparatus for trimming vegetation of claim 21, wherein said counter-balancing means comprises at least one spring.

26. The apparatus for trimming vegetation of claim 21, wherein said means for biasing is a tension spring.

* * * * *